UNITED STATES PATENT OFFICE.

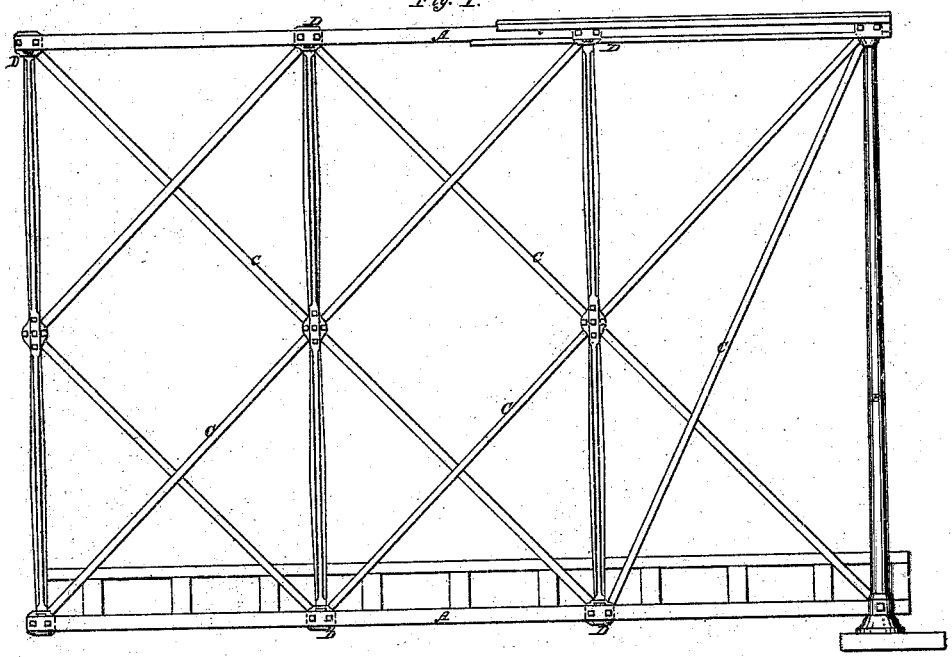
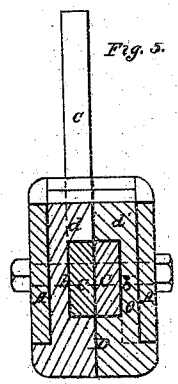
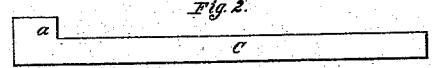
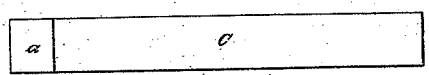
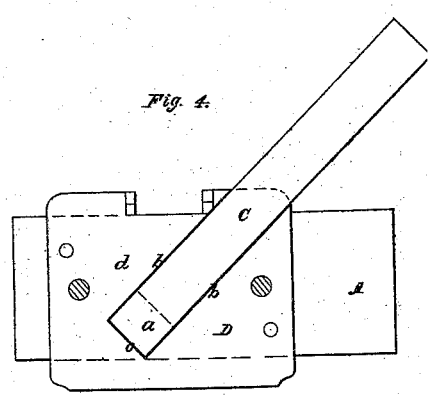

ALBERT D. BRIGGS, OF SPRINGFIELD, MASSACHUSETTS.

MODE OF CONNECTING THE BRACES OF IRON BRIDGES.

Specification of Letters Patent No. 32,555, dated June 18, 1861.

*To all whom it may concern:*

Be it known that I, ALBERT D. BRIGGS, of Springfield, in the county of Hampden and State of Massachusetts, have invented a new and useful Improvement in Iron Bridges; and I do hereby declare the same to be fully described in the following specification, and illustrated in the accompanying drawings, of which—

Figure 1, denotes a side elevation of a bridge containing my invention. Fig. 2, is an edge view of one of my improved braces. Fig. 3, is an underside view of the same. Fig. 4, is an inner side view of one half of my improved clamp. Fig. 5, is a transverse section of the clamping device, two braces and two chords, confined together by screw bolts and nuts.

In the construction of iron bridges provided with diagonal braces it is the usual practice to secure such braces together by means of bolts, or rivets passing through them. Such mode of connection has been found to be very objectionable, as the bolts or rivets not only soon grow loose in their holes on account of the rolling or vibration of the bridge, but the holes formed through such braces soon become greatly enlarged, thereby lessening the strength of such braces, and consequently impairing the strength of the bridge.

I am aware that in Letters Patent No. 24,068, the diagonal braces are constructed so that they shall lock or embrace each other at their points of intersection, and that they are secured together by a clamp of peculiar construction. This mode of connection is also objectionable, as in practice it is found almost impossible to construct the braces of the proper length, as in bending them at the points where they lock upon each other, the parts thus bent are found to be of unequal length, so that the joint must of necessity be more or less imperfect.

Both of the above modes differ entirely from mine—which consists in so constructing the diagonal braces and clamp plates, that each brace shall lock into one half of the clamp plate, independently of the other, and when the two clamp plates are brought together, shall cause the two braces to lap on or across each other, and be firmly held in place by the said clamp plates, when bolted together.

In Fig. 1, of the accompanying drawings, the structure of the bridge is represented as consisting of two horizontal chords, A, A, a series of vertical posts or braces, B, B, and a series of diagonal braces, C, C, the whole being united together by means of bolts passing through the clamps, D, D.

In the construction of my improved bridge the diagonal brace rods may be placed at any desirable angle, with respect to the chords and with each other, it being not essential that they should be at a right angle thereto. In the drawings, C, C, denotes such brace rods,—they being constructed of bars of iron, rectangular in form, each bar having at each of its ends, a projection formed upon it; the said bars are cut of a proper length to allow of each end of the bar to be turned down and welded upon itself, about the length of the width of such bar, thereby causing a square or nearly square shoulder, a, to be made thereon, as shown in the drawings.

d, d', represent the two halves of the clamping device, D, which connects the diagonal braces, C, C; they are of a rectangular shape, and are made of cast iron. Each part, d, or d', is recessed longitudinally on its outer side for the reception of the horizontal bar or chord, A,—while on its inside, a rectangular groove or recess is formed of a proper size to receive the diagonal brace rod, and so that when such brace rod is placed in the said recess, its outer face shall be just flush with the inner face of the clamp. At the lower end of each of such grooves or recesses, b, a deeper recess, or mortise, o, is made, of a size and depth, just sufficient to receive the shoulder, a, formed upon the end of the diagonal brace rod, thereby making, when such projection is placed within the recess, a rigid, unyielding joint. Thus it will be seen that each brace (whether main or counter,) is locked in each half of the clamping device, by means of the projection formed on the brace, fitting closely into the mortise, made in the inner part of the clamp, as represented, thereby giving each brace an independent bearing, at right angles to each other. When the two parts of the clamp are secured together by the bolts which pass through the chords and clamps, a firmer, more compact and rigid joint or connection is formed, than by any other mode known to have been heretofore used, for each brace rod has a connection with and bearing in the clamping pieces independent of any other brace and the bearings in the clamp against which the shoulder of the braces abut are always at right angles to the line of strain brought upon them, whatever may be the angle, the braces may make with the chords or with each other.

The above described mode of constructing my improved brace rods and their clamps, as well as the manner of connecting them together, is not only very simple, but when the parts are secured together, in manner as shown, give great firmness to them, and render any disarrangement of them impossible.

Having described my improvement, what I claim is—

My improved mode of constructing and arranging the clamp plates and braces, by which improvement each brace is made to lock into but one of the clamp plates, and simply lap over or across, the other brace, but not interlock therewith, the whole being substantially in manner and for the purpose set forth.

ALBERT D. BRIGGS.

Witnesses:
R. F. HAWKINS,
WM. BIRNIE.